United States Patent
Hasegawa et al.

(10) Patent No.: US 9,946,487 B2
(45) Date of Patent: *Apr. 17, 2018

(54) METHOD OF MOVING FILES IN HIERARCHICAL STORAGE SYSTEM

(71) Applicant: INTERNATIONAL BUSINESS MACHINES CORPORATION, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,251

(22) Filed: Sep. 19, 2017

(65) Prior Publication Data

US 2018/0004450 A1 Jan. 4, 2018

Related U.S. Application Data

(63) Continuation of application No. 14/821,834, filed on Aug. 10, 2015.

(30) Foreign Application Priority Data

Oct. 31, 2014 (JP) .................................. 2014-223801

(51) Int. Cl.
G06F 3/06 (2006.01)
G06F 17/30 (2006.01)

(52) U.S. Cl.
CPC .......... *G06F 3/0643* (2013.01); *G06F 3/0608* (2013.01); *G06F 3/0647* (2013.01); *G06F 3/0685* (2013.01); *G06F 17/30221* (2013.01)

(58) Field of Classification Search
CPC .... G06F 3/0608; G06F 3/0643; G06F 3/0647; G06F 3/0685; G06F 17/30221
See application file for complete search history.

(56) References Cited

U.S. PATENT DOCUMENTS 8,769,225 B2* 7/2014 Anderson ............. G06F 3/0613
                                                         711/161
8,775,759 B2   7/2014 Tofano
(Continued)

FOREIGN PATENT DOCUMENTS

JP    06103003 A    4/1994
JP    0944320 A     2/1997
(Continued)

OTHER PUBLICATIONS

IBM: List of IBM Patents or Patent Applications Treated as Related (Appendix P), Oct. 19, 2017, 2 pages.

*Primary Examiner* — Aracelis Ruiz
(74) *Attorney, Agent, or Firm* — L. Jeffrey Kelly

(57) ABSTRACT

A method for moving files in a hierarchical storage system having a primary storage and a secondary storage including a sequential storage device from the primary storage to the secondary storage includes obtaining a predetermined file size to be written to the secondary storage, extracting, from a plurality of files in the primary storage, a file not stored in the secondary storage and having the oldest last access time, estimating a file size of the file having the oldest last access time on the secondary storage if the file having the oldest last access time is written to the secondary storage, and selecting the file having the oldest last access time as a file to be moved to the secondary storage as long as the estimated file size does not exceed the predetermined file size to be written to the secondary storage.

17 Claims, 5 Drawing Sheets

(56) References Cited

U.S. PATENT DOCUMENTS

| | | | |
|---|---|---|---|
| 9,671,976 | B2 | 6/2017 | Harvey et al. |
| 2004/0003151 | A1 | 1/2004 | Bateman et al. |
| 2008/0195826 | A1 | 8/2008 | Yamazaki et al. |
| 2011/0035409 | A1 | 2/2011 | Shimada et al. |
| 2011/0179247 | A1 | 7/2011 | Mine et al. |
| 2015/0199980 | A1 | 7/2015 | Aoki |
| 2016/0124678 | A1 | 5/2016 | Hasegawa et al. |

FOREIGN PATENT DOCUMENTS

| | | | |
|---|---|---|---|
| JP | 2000339867 | A | 12/2000 |
| JP | 2000347982 | A | 12/2000 |
| JP | 2003150413 | A | 5/2003 |
| JP | 2009053897 | A | 3/2009 |
| JP | 2010097646 | A | 4/2010 |
| JP | 2010152603 | A | 7/2010 |
| JP | 2011034525 | A | 2/2011 |
| JP | 2012243339 | A | 12/2012 |
| JP | 2016091245 | A | 5/2016 |
| WO | 2010131292 | A1 | 11/2010 |

* cited by examiner

METHOD OF MOVING FILES IN HIERARCHICAL STORAGE SYSTEM

CROSS-REFERENCE TO RELATED APPLICATIONS

The present application claims the benefit of priority of Japanese Patent Application Serial Number 2014-223801, filed on Oct. 31, 2014 with the Japanese Patent Office (JPO), the contents of which are herein incorporated by reference in its entirety.

BACKGROUND

The present invention generally relates to a hierarchical storage system and, more particularly, to a method of moving files from a primary storage to a secondary storage in a hierarchical storage system.

As a mechanism for accessing data on a tape drive as a file in a file system, the LTFS (Linear Tape File Systems) is in practical use, for example. In the LTFS, a file system is created by maintaining meta-information, which includes a position and a size of a data area that constitutes a file on a tape, for example, as an index. By utilizing the LTFS, a tape may be used as a destination for storing files in a similar way to a storage device such as an HDD and a USB memory.

The LTFS may be utilized without making any modification to an application that is currently using an HDD. If an application designed to use an HDD is operated with the LTFS on an as is basis, however, access to files may take longer than expected, and the application may end the access by timeout. In order to avoid this, the LTFS is sometimes configured as a part of hierarchical storage (HSM: hierarchical storage management), in which a high-speed storage such as an HDD and an SDD is used as a primary storage and a sequential access device such as a tape drive operating on the LTFS is used as a secondary storage, instead of directly using files on the LTFS.

In current HSM systems, it is common to use an HDD as a primary storage, and applications save files on the HDD and move the files to a secondary storage on the LTFS at a particular timing. When a file is moved from the primary storage to the secondary storage, a file called stub, which indicates the existence of the file moved to the secondary storage, is created on the primary storage. When the stub is accessed, the corresponding file on the secondary storage is read and moved to the primary storage for responding to the access.

For example, a file may be moved from the primary storage to the secondary storage when the usage rate of the HDD exceeds a specific threshold, or at a time specified by a user. In case a file is moved on the basis of a threshold, all the files whose stub is not created on the primary storage could be moved. In order to reduce a response time for reading a file from an application, however, only the minimum number of files needed for reducing the usage rate of the HDD below the threshold may be moved so that as much number of files as possible are left on the primary storage.

In that case, it is common to utilizing the LRU algorithm for selecting files so that, the least frequently accessed file is selected among the files whose stub is not created on the primary storage. This method of selecting files by utilizing the LRU algorithm works well when CD-R, DVD, or the like is used as the secondary storage. If a tape/tape drive is used as the secondary storage, however, a read time of a file differs according to the position of the file on the tape. In other words, there are some files that may be read from the tape in relatively short time and others that are read from the tape in relatively long time.

When writing data on a tape, a tape drive that meets the LTO standard or the like writes data in a longitudinal direction of the tape while moving the tape back and forth for many times. When the tape is mounted on the tape drive for reading data, it takes a shorter time to access the beginning of a file that is written on the tape from a position close to a leading end of the tape in the longitudinal direction. On the other hand, it takes a longer time to access the beginning of a file that is written on the tape from a point close to a trailing end of the tape in the longitudinal direction. As a result, some files may be read from the tape in relatively short time while others are read from the tape in relatively long time, as described above.

SUMMARY

Embodiments of the present invention may reduce the above described delay in reading files in a conventional HSM system and shorten, as much as possible, the average read time of sporadic read accesses that occur in the HSM system using a tape.

A first aspect of the present invention may provide a method for moving files in a hierarchical storage system having a primary storage and a secondary storage including a sequential storage device from the primary storage to the secondary storage. The method may include the steps of:

(a) obtaining a predetermined file size that may be written to the secondary storage;

(b) extracting, from a plurality of files in the primary storage, a file not stored in the secondary storage and having the oldest last access time;

(c) estimating a file size of the file having the oldest last access time on the secondary storage if the file having the oldest last access time is written to the secondary storage; and (d) selecting the file having the oldest last access time as a file to be moved to the secondary storage as long as the estimated file size does not exceed the predetermined file size that may be written to the secondary storage.

According to the one aspect of the present invention, by identifying an area having a predetermined file size on the secondary storage to which files on the primary storage are to be moved, it is possible to increase the speed of reading a file that is moved to the area having the predetermined file size.

In another aspect of the present invention, the method further includes a step of repeating the extracting step (b) to the selecting step (d) until the predetermined file size is exceeded.

According to the another aspect of the present invention, a plurality of files may be continuously moved to the area having a predetermined file size on the secondary storage.

In still another aspect of the present invention, the method may further include a step of writing files that are moved to the secondary storage in an area identified on the secondary storage as having the predetermined file size in an ascending or descending order of file size.

According to the still another aspect of the present invention, it may be possible to shorten the time needed for accessing the beginning of a file that is to be read by writing files in an ascending order of file size in a direction of reading files in the secondary storage.

Yet another aspect of the present invention may provide a method for moving files in a hierarchical storage system having a primary storage including at least one HDD and a secondary storage including at least one tape drive from the primary storage to the secondary storage. The method may include the steps of:

(a) obtaining, from the tape drive, a data size that may be written on one wrap of a tape;

(b) extracting, from a plurality of files in the primary storage, a file not stored in the secondary storage and having the oldest last access time;

(c) estimating a file size of the file having the oldest last access time on the one wrap if the file having the oldest last access time is written to the tape in the tape drive; and (d) selecting the file having the oldest last access time as a file to be moved to the tape drive as long as the estimated file size does not exceed the data size that may be written on the one wrap.

According to the yet another aspect of the present invention, by identifying the data size that may be written on one wrap of the tape in the tape drive to which files in the primary storage are to be moved, it is possible to increase the speed of reading a file that is moved to the one wrap.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1:
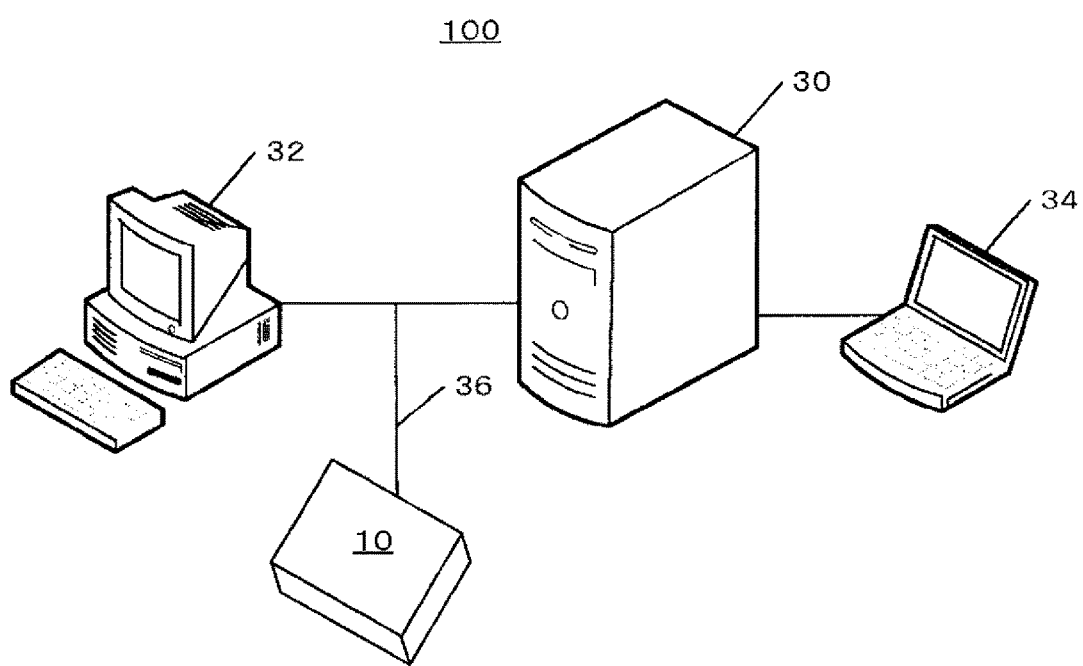
FIG. 1 illustrates a configuration example of a file system, according to an embodiment of the present disclosure.

The present invention will now be described with reference to the accompanying drawings. FIG. 1 illustrates a configuration example of a file system 100 in which a method of the present invention may be carried out. The file system 100 may include a tape drive 10, a host (server) 30, and PCs (terminals) 32 and 34 that may communicate with each other via a network 36. The host (server) 30 and the PCs (terminals) 32 and 34 may respectively include an internal or external storage device (such as an HDD or SSD, which is not shown).

In FIG. 1, as one example, only one tape drive 10 and one host (server) 30 are illustrated. However, a plurality of separate tape drives 10, a tape library including a plurality of tape drives 10, or a plurality of hosts (servers) 30 may also be considered.

The file system 100 may be created as the LTFS, for example. As described above, in the LTFS, it may be possible to directly access a file stored in a tape cartridge after inserting the tape cartridge into a tape drive, just like using an HDD, a USB memory, or other removable media such as CD-R.

Figure 2:
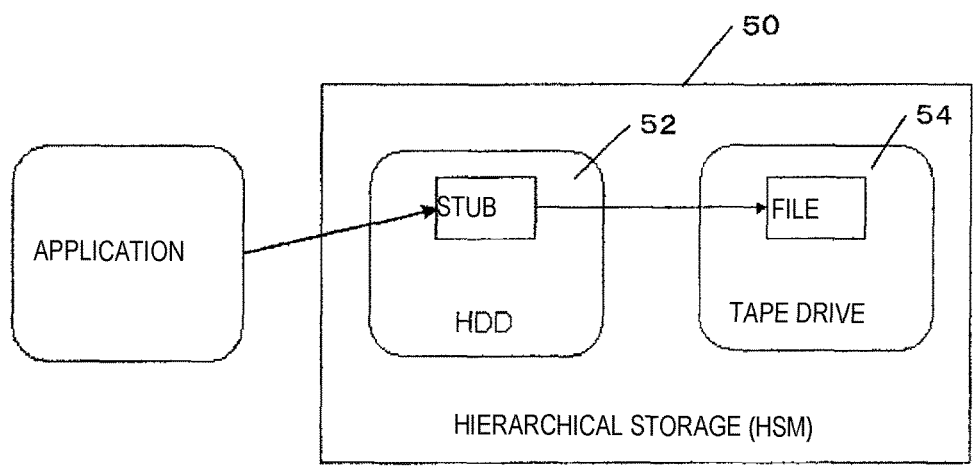
FIG. 2 illustrates a configuration example of a hierarchical storage (HSM), according to an embodiment of the present disclosure.

FIG. 2 illustrates a configuration example of a hierarchical storage (hereinafter referred to as "HSM") that may be utilized in the file system 100 in FIG. 1. An HSM 50 may include a primary storage 52 and a secondary storage 54. The primary storage 52 may include at least one HDD or SSD, for example. The secondary storage 54 may include at least one sequential access device such as, for example, a tape drive.

In the example of the HSM 50 illustrated in FIG. 2, the application stores a file in the HDD of the primary storage 52 and moves the file to the tape drive of the secondary storage 54 at a particular timing. When the file is moved from the primary storage 52 to the secondary storage 54, a file called stub that indicates the existence of the moved file is created on the primary storage 52. When the stub is accessed, the corresponding file on the secondary storage 54 is read and moved to the primary storage 52 for responding to the access. As described below, embodiments of the present invention may provide a method for increasing the speed of reading a file from the secondary storage 54 in response to a file access in the HSM 50 as much as possible.

Figure 3:
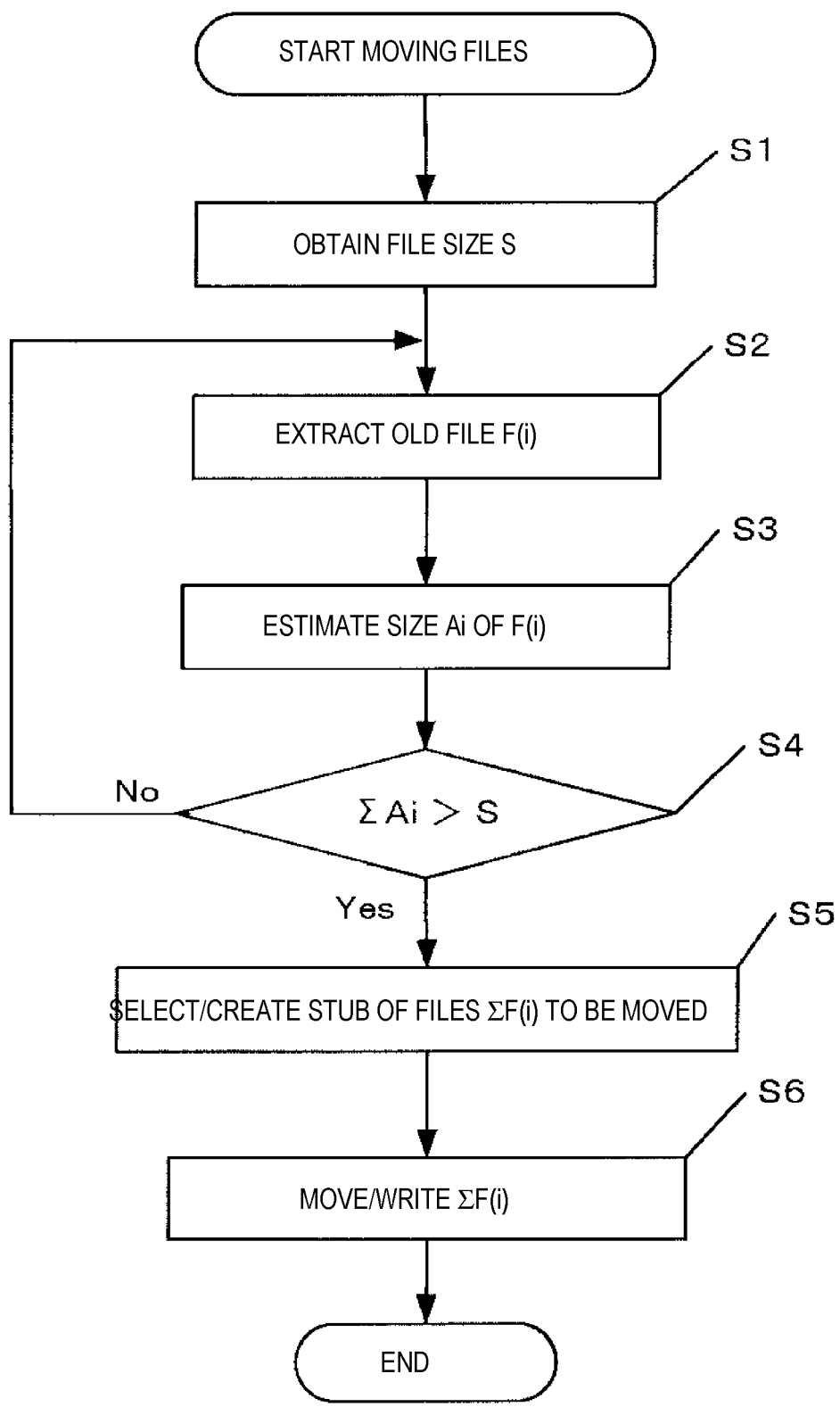
FIG. 3 illustrates a flow of a method, according to an embodiment of the present disclosure.

A method as an embodiment of the present invention will now be described with reference to FIGS. 3 to 5. FIG. 3 illustrates the flow of the method as one embodiment of the present invention. The method as one embodiment of the present invention including the flow illustrated in FIG. 3 may be carried out by using predetermined software and hardware available to the computers 30 to 34 or the tape drive 10 in the file system 100. Although in the following example the tape drive (tape) is used as the secondary storage 54 constituting the HSM 50, the present invention may be applicable to a case in which another sequential access device is used as the secondary storage 54.

In step S1 illustrated in FIG. 3, a predetermined file size that may be written to the secondary storage 54 may be obtained from the secondary storage 54. Particularly, a file (data) size that may be written on one wrap of a tape may be obtained from the tape drive. A wrap may be generally defined as a group of multiple tracks on a tape. In the LTFS, a record number, which may be a logical position on the tape, is used for accessing a file on the tape. After receiving an access request that specifies a record number, the tape drive may convert the record number to a physical position on the tape for allowing the access. Accordingly, the LTFS may not recognize a physical position on the tape. The tape drive, on the other hand, may recognize a physical position of data that was most recently written on the tape, and is able to predict/estimate a data size that may be written on the same wrap from that position.

Thus, the tape drive may be provided with an interface capable of querying a flag F that indicates whether the wrap extends in a trailing end direction of the tape (hereinafter referred to as an "LP4 direction") or a leading end direction of the tape (hereinafter referred to as an "LP3 direction") opposite to the trailing end direction at the time of accessing the wrap, and a data size S that may be written on the wrap. In the LTFS, the flag F and the data size S may be obtained via the interface.

In step S2, a file F(i) not stored in the secondary storage 54 and having the oldest last access time may be extracted from a plurality of files in the primary storage 52. Specifically, in one embodiment, the file F(i) having the oldest last access time may be extracted by using a list in which files not having a corresponding stub in the primary storage 52 may be included in a chronological order.

Here, the file having the oldest last access time may be extracted because the file is less likely (frequently) used in each application and the need for permanently storing the file in the primary storage 52 may be low. Instead of or in addition to extracting the file having the oldest last access time, a file may be extracted, for example, in a descending order of file size. This may increase the memory's capacity (or decrease the usage rate) of the primary storage 52.

In step S3, a file size (data size) Ai of the file F(i) extracted in steps S2 on a wrap of the tape in the tape drive may be estimated, if the file F(i) is written on the tape. This may be performed for estimating the physical size needed for writing the file F(i) with respect to the data size S that may be written on the one wrap obtained in step S1.

If the tape drive does not utilize a compression function, the data size Ai may be equal to a normal file size of the file F(i). If the tape drive utilizes the compression function, the file size of the file F(i) after being compressed in a similar manner to the compression function of the tape drive may need to be estimated. Therefore, each file may be compressed on the primary storage 52 by using an algorithm similar to that of the compression function of the tape drive. In this case, a compressed file may be written on the tape, and because the tape drive simply writes the compressed file on the tape, the size of the data may not change after being written on the tape.

In step S4, it is determined whether a total ΣAi of the data size Ai obtained in step S3 is larger than the data size S. If No, which means that the ΣAi does not exceed the data size S, then the flow goes back to step S2, and another file F(i) not stored in the secondary storage 54 and having the oldest last access time may be extracted. If Yes in step S4, an aggregate ΣF(i) including previously extracted files F(i) may selected in step S5 as files to be moved to the tape drive. At the same time, a stub corresponding to each file in the aggregate ΣF(i) is created in the primary storage 52. Alternatively, each time a file F(i) is extracted, the information may be added to the stub.

In step S6, the aggregate ΣF(i) of the files whose stub is created may be sent to the tape drive, and the tape drive may write the aggregate ΣF(i) on an appropriate wrap of the tape.

Figure 4:
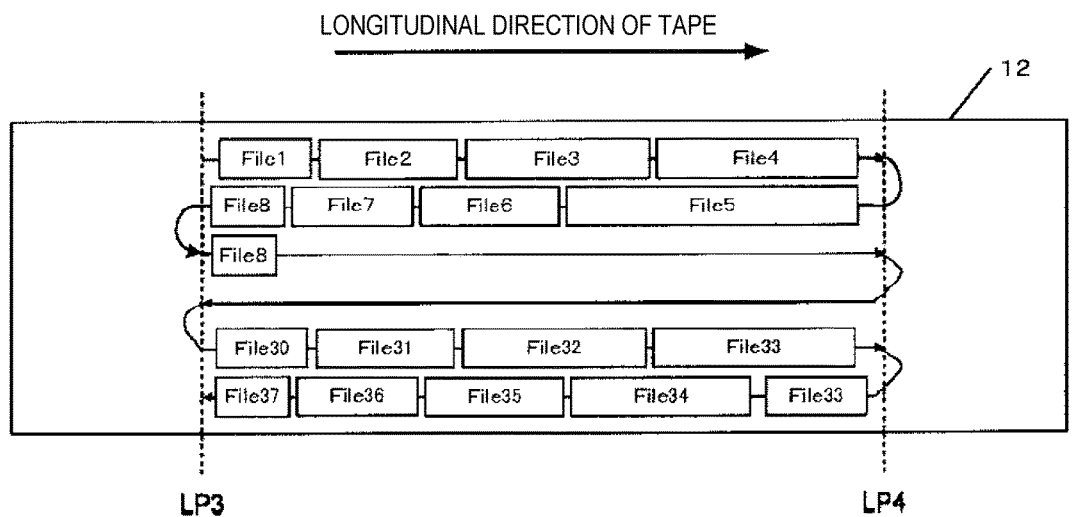
FIG. 4 illustrates an example of writing files, according to an embodiment of the present disclosure.

FIG. 4 illustrates an example of writing files, according to an embodiment of the present disclosure. A square region illustrated in FIG. 4 with reference numeral 12 represents a tape. The tape 12 may include a plurality of wraps along a longitudinal direction of the tape 12. The LP3 and the LP4 represent leading and trailing ends of each wrap at which each wrap makes a 180-degree turn. Similarly, if the flag F, which is also described above as indicating the extending direction of the wrap at the time of accessing the wrap, may indicate the LP4 direction (rightward in the figure), the files included in the aggregate ΣF(i) may be written on the tape 12 in an ascending order of data size on the tape 12. FIG. 4 illustrates the example in which File1, File2, File3 and File4 may be sequentially written on one wrap in an ascending order of data size. Similarly, on another wrap, File30, File31, File32, and File33 may be sequentially written in an ascending order of data size. There are two File33s, which may indicate the case in which the data of File33 may not fit in the remaining space of one wrap and the file is thus forced to be written on two consecutive wraps as two data areas.

On the other hand, if the F indicate the LP3 direction (leftward in the figure), the files may be written on the tape in a descending order of data size on the tape 12. FIG. 4 illustrates the example in which File5, File6, File7, and File8, or File34, File35, File36, and File37 may be sequentially written on another wrap in a descending order of data size. Similar to File33s, there are two File8s, which may indicate the case in which the data of File8 may not fit in the remaining space of one wrap and the file is thus forced to be written on two consecutive wraps as two data areas. As just described, one feature of the present invention may be that files are written in an ascending order of data size from the LP3 to the LP4, regardless which direction the F indicates.

Reading of files on a tape will now be described with reference to FIG. 5. Here, it will be described that writing files on a wrap from the LP3 to the LP4 in an ascending order of data size as illustrated in FIG. 4 may facilitate the reduction of an expected value of a total time needed for accessing the beginning of a file and reading the file. In other words, it will be described that the above described writing may reduce the average read time when sporadic readings happen.

Figure 5:
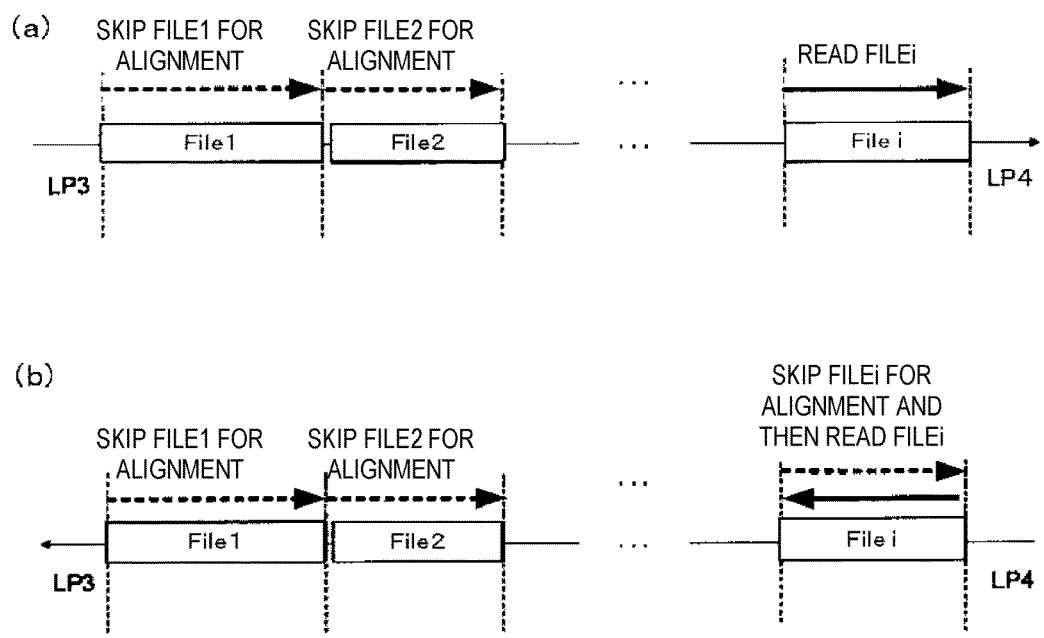
FIG. 5 illustrates an example of reading files, according to an embodiment of the present disclosure.

FIG. 5 illustrates an example of reading files, according to an embodiment of the present disclosure. FIG. 5(a) illustrates reading a file Filei that is written in a direction from the LP3 to the LP4. FIG. 5(b) illustrates reading a file Filei that is written in a reverse direction from the LP4 to the LP3. Generally, after no access is executed for a predetermined time, a tape mounted on the tape drive may be rewinded and the tape drive may change to a standby mode. In that case, if sporadic accesses occur, then an access to the beginning of a file may always start from the leading end of the tape.

With reference now to FIG. 5(a). In case n files of f1, . . . . fn are written on a wrap, if the time needed for accessing the beginning of a file fi may be represented as L(fi) and the time needed for reading the file fi after accessing the beginning of the file fi may be represented as R(fi), then the time TF(fi) needed for reading the file fi written in a direction from the LP3 to the LP4 may be expressed by the following formula:

$$TF(f_i)=L(f_1)+\ldots+L(f_{i-1})+R(f_i)$$

If the files f1, . . . fn are read in similar frequency, then the probability of the occurrence of access to the file fi may be expressed as (1/n). Thus, the average read time EF for reading one file may be expressed by the following formula:

$$EF = \frac{1}{n}\sum_{i=1}^{n} TF(f_i)$$
$$= \frac{1}{n}((R(f_1)) + (L(f_1) + R(f_2)) + (L(f_1) + L(f_2) + R(f_3)) + \ldots +$$
$$(L(f_1) + \ldots + L(f_{n-1}) + R(f_n)))$$
$$= \frac{n-1}{n}L(f_1) + \frac{n-2}{n}L(f_2) + \ldots + \frac{1}{n}L(f_{n-1}) + \frac{1}{n}\sum_{i=1}^{n}R(f_i)$$

With reference now to FIG. 5(b). The time TR(fi) needed for reading a file fi written in a direction from the LP4 to the LP3 may be expressed by the following formula:

$$TF(f_i) = L(f_1) + \ldots + L(f_{i-1}) + R(f_i)$$

In this case, the average read time ER for reading one file may be expressed with the following formula:

$$ER = \frac{1}{n}\sum_{i=1}^{n} TR(f_i)$$
$$= \frac{1}{n}((L(f_1) + R(f_1)) + (L(f_1) + L(f_2) + R(f_2)) + \ldots +$$
$$(L(f_1) + \ldots + L(f_n) + R(f_n)))$$
$$= L(f_1) + \frac{n-1}{n}L(f_2) + \ldots + \frac{1}{n}L(f_n) + \frac{1}{n}\sum_{i=1}^{n}R(f_i)$$

From the above two formulas of EF and ER, and because L(fi) is larger than 0, both EF and ER may be minimized by arranging the file fi so that L(fi) becomes less than L(fi+1). When creating the aggregate ΣF(i) of files whose stub is to be created, if the total data size ΣAi is larger than the data size S, a part of the last file to be written on a wrap may be written on a succeeding wrap, as with the case of the File8 and the File33 illustrated in FIG. 4. Even in that case, the time needed for reading a file written on a wrap in a direction from the LP3 to the LP4 may be expressed by the following formula:

$$TF(f_i) = L(f_1) + \ldots + L(f_{i-1}) + R(f_i)$$

If the wrap extends from the LP4 to LP3, the time needed for reading a file may be expressed with the following formula:

$$TF(f_i) = L(f_1) + \ldots + L(f_{i-1}) + R(f_i)$$

Because the average time needed for reading a file is the same in both cases, the criteria for minimizing EF and ER does not change, and EF and ER may be always minimized when L(fi) is less than L(fi+1). Accordingly, in order to reduce the average read time, it may be effective to write files in a direction from the LP3 to the LP4 in an ascending order of file size, even if a file (data) is written on two consecutive wraps.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention has been described with reference to the accompanying drawings. The present invention is not limited to these embodiments, however. Also, the present invention may be embodied with various improvements, modifications, and variations on the basis of the expertise of a person ordinarily skilled in the art to which the invention pertains without departing from the spirit of the invention.

What is claimed is:

1. A computer system for moving files from a primary storage to a secondary storage in a hierarchical storage system, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising the steps of:
   obtaining, from the secondary storage, a predetermined file size of an area of the secondary storage available to be sequentially written in one direction of the secondary storage, the secondary storage comprising a sequential access storage device;
   receiving, from the secondary storage, an indication whether the one direction of the secondary storage comprises a trailing end direction of the secondary storage or a leading end direction of the secondary storage opposite to the trailing end direction at a time of accessing the secondary storage;
   extracting, from a plurality of files in the primary storage, a file not stored in the secondary storage and having an oldest last access time;
   estimating a physical size needed for writing the extracted file in the secondary storage;
   in response to the estimated physical size not exceeding the predetermined file size of the area of the secondary storage available to be sequentially written, selecting the file having the oldest last access time as a file to be written to the secondary storage; and
   writing the selected file to the area of the secondary storage available to be sequentially written according to the one direction of the secondary storage.

2. The computer system according to claim 1, further comprising the step of:
   repeating the extracting step to the writing step until the predetermined file size is exceeded.

3. The computer system according to claim 1, further comprising the step of:
   storing information in the primary storage corresponding to the extracted file written to the secondary storage.

4. The computer system according to claim 1, further comprising the step of:
   writing the selected file to the area of the secondary storage available to be sequentially written in an ascending or descending order according to the estimated file size.

5. The computer system according to claim 1, further comprising the step of:
   writing the selected file to the area of the secondary storage available to be sequentially written in an ascending order of file size according to the one direction of the secondary storage,
   wherein the one direction extends from the leading end direction to the trailing end direction of the secondary storage.

6. The computer system according to claim 1, further comprising the step of:
   writing the selected file to the area of the secondary storage available to be sequentially written in a direction opposite to the one direction in a descending order of file size,
   wherein the direction opposite to the one direction extends from the trailing end direction to the leading end direction of the secondary storage.

7. The computer system according to claim 1, wherein the sequential storage device is a tape drive, and the predetermined file size of the area of the secondary storage available to be sequentially written corresponds to a data size to be written on one wrap of a tape readable/writable in the tape drive.

8. A computer system for moving files from an HDD to a tape drive in a hierarchical storage system, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising the steps of:

obtaining, from the tape drive, a data size available to be sequentially written in a wrap of a tape within the tape drive;

receiving, from the tape drive, an indication whether the wrap extends in a trailing end direction of the tape or in a leading end direction of the tape opposite to the trailing end direction at a time of accessing the wrap;

extracting, from a plurality of files in the HDD, one or more files not stored in the tape drive in an ascending order of data size;

estimating a physical size needed for writing the extracted one or more files in the tape drive;

in response to the estimated physical size not exceeding the data size available to be sequentially written in the tape drive, selecting the extracted one or more files as files to be written to the tape drive; and in response to the wrap extending from the leading end direction of the tape to the trailing end direction of the tape, writing the extracted one or more files in an ascending order of data size from the leading end direction to the trailing end direction.

9. The computer system according to claim 8, further comprising a step of repeating the extracting step to the writing step until the data size available to be sequentially written in the wrap is exceeded.

10. The computer system according to claim 8, further comprising the steps of:

storing information in the HDD corresponding to the extracted one or more files written to the tape drive.

11. The computer system according to claim 8, further comprising the step of:

extracting, from the plurality of files in the HDD, one or more files not stored in the tape drive having an oldest last access time in a chronological order.

12. The computer system according to claim 8, further comprising the step of:

in response to the wrap extending from the trailing end direction of the tape to the leading end direction of the tape, writing the extracted one or more files in a descending order of data size from the trailing end direction to the leading end direction.

13. A computer program product for moving files from an HDD to a tape drive in a hierarchical storage system, the computer program product comprising:

a computer readable non-transitory article of manufacture tangibly embodying computer readable instructions which, when executed, cause a computer to carry out a method comprising the steps of:

obtaining, from the tape drive, a data size available to be sequentially written in a wrap of a tape within the tape drive;

receiving, from the tape drive, an indication whether the wrap extends in a trailing end direction of the tape or in a leading end direction of the tape opposite to the trailing end direction at a time of accessing the wrap;

extracting, from a plurality of files in the HDD, one or more files not stored in the tape drive in an ascending order of data size;

estimating a physical size needed for writing the extracted one or more files in the tape drive;

in response to the estimated physical size not exceeding the data size available to be sequentially written in the tape drive, selecting the extracted one or more files as files to be written to the tape drive; and in response to the wrap extending from the leading end direction of the tape to the trailing end direction of the tape, writing the extracted one or more files in an ascending order of data size from the leading end direction to the trailing end direction.

14. The computer program product according to claim 13, further comprising a step of repeating the extracting step to the writing step until the data size available to be sequentially written in the wrap is exceeded.

15. The computer program product according to claim 13, further comprising the steps of:

storing information in the HDD corresponding to the extracted one or more files written to the tape drive.

16. The computer program product according to claim 13, further comprising the step of:

extracting, from the plurality of files in the HDD, one or more files not stored in the tape drive having an oldest last access time in a chronological order.

17. The computer program product according to claim 13, further comprising the step of:

in response to the wrap extending from the trailing end direction of the tape to the leading end direction of the tape, writing the extracted one or more files in a descending order of data size from the trailing end direction to the leading end direction.

* * * * *